United States Patent [19] [11] 4,327,430
Wada et al. [45] Apr. 27, 1982

[54] INFORMATION SIGNAL RECORDING MEDIUM OF ROTARY TYPE WITH OVERLAPPED TRACKS

[75] Inventors: Yoshiyo Wada; Hisao Kinjo, both of Yokohama; Ichiro Ueno, Isehara, all of Japan

[73] Assignee: Victor Company of Japan, Ltd., Yokohama, Japan

[21] Appl. No.: 55,752

[22] Filed: Jul. 6, 1979

Related U.S. Application Data

[63] Continuation of Ser. No. 876,558, Feb. 9, 1978, abandoned.

[30] Foreign Application Priority Data

Feb. 9, 1977 [JP] Japan ................................. 52-13322
Feb. 12, 1977 [JP] Japan ................................. 52-14438
Feb. 14, 1977 [JP] Japan ................................. 52-14870
Feb. 23, 1977 [JP] Japan ................................. 52-18056

[51] Int. Cl.³ .......................... H04N 5/80; G11B 11/00
[52] U.S. Cl. ...................................... 369/43; 369/276; 369/111; 358/128.5
[58] Field of Search ................. 179/100.1 G, 100.3 V, 179/100.4 C; 358/128.5, 127, 130, 132; 365/120, 124, 127, 215; 274/41.6 R; 346/76 L, 108, 137; 369/275, 276, 284, 132, 44, 43, 111

[56] References Cited

U.S. PATENT DOCUMENTS 3,438,050  4/1969  Ascherbrenner ................ 346/76 L
3,673,412  6/1972  Olson ........................... 179/100.3 V
3,701,846  10/1972 Zenzefilis ...................... 179/100.3 V
3,787,887  1/1974  Burton .......................... 346/108
3,800,099  3/1974  Dickopp ........................ 179/100.3 V
3,894,179  7/1975  Jacobs .......................... 179/100.3 V
3,919,697  11/1975 Walker .......................... 360/77
4,051,329  9/1977  Blanket ......................... 179/100.3 V
4,084,185  4/1978  Lang ............................ 179/100.3 V
4,161,752  7/1979  Basilico ........................ 179/100.3 V
4,199,782  4/1980  Woods et al. ................... 179/100.41 G

FOREIGN PATENT DOCUMENTS 2352669  5/1974  Fed. Rep. of Germany ... 179/100.4 L

OTHER PUBLICATIONS

"Servo disk with overlapping servo and data tracks" by Cimpli IBM Techn. Disc. Bull., vol. 16, No. 6, p. 1818, Nov. 1973.

Primary Examiner—Bernard Konick
Assistant Examiner—Alan Faber
Attorney, Agent, or Firm—Michael N. Meller; Anthony H. Handal

[57] ABSTRACT

An information signal recording medium of rotary type has a flat surface with successions of pits formed therein as respective concavities in response to an information signal. The successions of pits constitute respective circular tracks of a specific pitch. Each it is formed with a width, equal to the width of a track, which is substantially equal to or greater than said pitch of the track.

1 Claim, 12 Drawing Figures

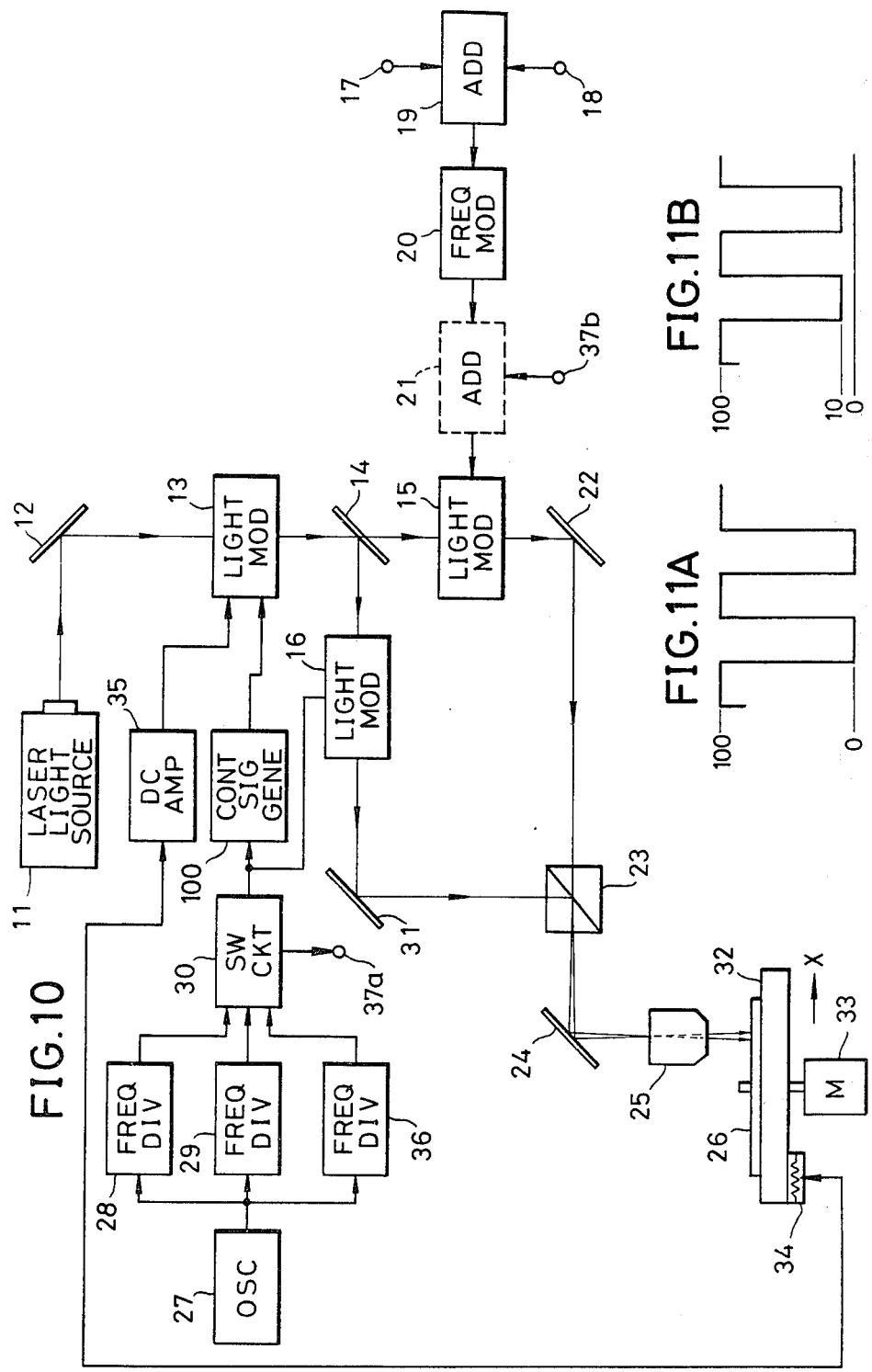

INFORMATION SIGNAL RECORDING MEDIUM OF ROTARY TYPE WITH OVERLAPPED TRACKS

This is a continuation of application Ser. No. 876,558 filed Feb. 9, 1978, now abandoned.

BACKGROUND OF THE INVENTION

The present invention relates generally to rotary mediums for recording thereon information signals and to apparatuses for recording the information signals thereon. More particularly, the invention relates to an information signal recording medium of rotary type on which pits for recording an information signal are formed without positively providing a groove for guiding a reproducing stylus and, moreover, in an arrangement such that a groove effect is not produced at the time of reproduction.

The systems known heretofore for recording and reproducing information signals such as video signals and/or audio signals on and from disc-shaped, rotary mediums (referred to hereinafter simply as discs) are broadly divided into systems in which reproduction is carried out optically, systems in which reproduction is carried out by means of a reproducing stylus employing a piezoelectric element, and systems in which reproduction is carried out by utilizing variations in the electrostatic capacitance between an electrode provided on the reproducing stylus and the recorded surface of the disc.

We have considered the advantages and disadvantages of these three kinds of systems and have adopted the electrostatic capacitance system as being the most desirable. Further, the present applicant has previously proposed, as a new system for overcoming the problems accompanying known electrostatic capacitance system, a novel "Information signal recording and reproducing system" as disclosed in the specification of U.S. Pat. Application Ser. No. 785,095.

More specifically, in accordance with a known electrostatic capacitance system, recording is accomplished in the recording system by forming a spiral guide groove in the disc for guiding the reproducing stylus and, at the same time, forming pits in responsive correspondence with an information signal to be recorded on the bottom surface of the groove. In the reproducing system, the reproducing stylus, being guided by the guide groove, traces the track within the groove and thereby reproduces the signal in response to variations in the electrostatic capacitance.

In this known system however, since a reproducing stylus guiding groove is provided in the disc, and the reproducing stylus is compulsorily guided by this guide groove, it is not possible for the reproducing stylus to undergo operations such as riding over the groove wall of one track and moving into another track and returning to the original track. If the reproducing stylus were to be forced to undergo such an operation, the groove and the stylus would be damaged. For this reason, it has not been possible in this known system to carry out special reproduction such as quick-motion picture reproduction, slow-motion picture reproduction, and still-picture reproduction.

Furthermore, since the area of contact between the tip of the reproducing stylus and the guide groove of the disc is small, the stylus easily wears. When the width of the stylus tip reaches the groove width as a result of abrasive wear, the serviceable life of this reproducing stylus ends. Thus, this system is accompanied by the problem of short life of the reproducing stylus. Another problem is that fine chip particles abraded from the disc by the tracing action of the reproducing stylus along the guide groove give rise to difficulties such as further promotion of the wear and damage of the stylus and the guide groove and an increase of the gap between the electrode at the stylus tip and the recorded surface including the pits within the disc guide groove, whereby the reproduced output decreases because of spacing loss.

If the rotational speed of the disc is set at a low value such as 450 rpm., for example, in order to prolong the life of the stylus tip, the recording wavelength of the information signal recorded in the guide groove will become short. For this reason, a recording apparatus of low price in which laser light is used cannot be employed in the recording system, and the disadvantageous employing of a recording apparatus of high price using an electron beam becomes unavoidable.

Accordingly, with the aim of overcoming the various problems of the known systems described above, the present applicant has proposed by the aforecited patent applications a novel system for recording and reproducing information signals. According to this proposed system, in the recording system thereof, pits are formed in accordance with the information signal being recorded along a spiral track on a recording medium of flat disc shape, without forming a groove therein, and, in the reproducing system, a reproducing stylus traces over and along this track thereby to reproduce the recorded information signal. In this proposed system, pilot or reference signals are recorded on or in the vicinity of a track of the information signal such as video signal on a rotary disc. At the time of reproducing, the reference signals are reproduced together with the video signal, and tracking servo control is carried out so that the reproducing stylus traces accurately along the track in response to the reproduced reference signals.

By the use of this previously proposed system, since the recording track has no groove, there is no possibility whatsoever of the reproducing stylus or the recording medium being damaged, and the stylus can trace the same portion of the track repeatedly a plurality of times, whereby a special reproduction such as still, slow motion, or quick motion reproduction becomes possible. Furthermore, other difficulties of the known system are removed.

Furthermore, as a reproducing stylus of highly desirable characteristics for reproducing an information signal recorded on a disc without a reproducing stylus guide groove, the present applicant has previously proposed a novel "Stylus for reproducing information signals recorded on a recording medium" as disclosed in the specification of U.S. Pat. Application Ser. No. 852,366 now U.S. Pat. No. 4,199,782. This proposed reproducing stylus has a bottom surface with a maximum width portion which is greater than the track pitch and has an electrode of a width smaller than the track pitch over a specific distance from the stylus tip.

A feature of this proposed reproducing stylus is that the stylus pressure per unit area is small, and the rate of abrasive wear of the reproducing stylus and the disc is low. Another feature of this stylus is that, since the electrode width does not increase appreciably even when the stylus tip becomes somewhat worn after a long period of use, the life of the reproducing stylus is remarkably long.

Thus, by using the recording and reproducing system and the reproducing stylus according to the above cited proposals, the problems encountered in the prior art are overcome, and very good results can be obtained.

Accordingly, the present applicant has been carrying out research on the reduction to practice of a system in which an information signal track is recorded on a smooth-surface disc without a groove with a track pitch greater than the track width (pit width), that is, with the information signal tracks in spaced-apart state, and a reference signal (hereinafter referred to as a pilot signal) for tracking control is recorded in the space between adjacent tracks, reproduction being carried out by the above mentioned reproducing stylus.

However, it has been found that, in spite of the absence from the beginning of a reproducing stylus guide groove in the disc and the fact that the reproducing stylus is contacting the disc over a width greater than the track pitch, certain adverse phenomena occur just as though a guide groove had been formed beforehand in the disc. More specifically, impairment of the aforementioned special modes of reproducing operation, decrease in the reproduced output due to spacing loss, or wear and damage of the reproducing stylus of the disc to a greater extent than expected occur. The cause of these phenomena has been determined to be the formation, in resultant effect, in the disc of a slight groove shape effect or a configuration effect which acts similarly as a groove.

Accordingly, the present inventors have studied this phenomenon of a groove guiding effect as a resultant effect and, as a result, have arrived at the following two causes thereof.

The first cause is that the track along which an information signal has been recorded is of very slight groove shape. Irrespective of whether the recording beam which forms the pits in the disc in response to the information signal being recorded is a light beam or whether it is an electron beam, its energy distribution over its cross section is not uniform. Furthermore, when the beam is projected onto the resist layer of the surface of the recording original disc, this beam is reflected and scattered at parts such as the outer surface, interior, and bottom surface of the resist layer. For these reasons, even when the beam is projected accurately onto the positions for forming the pits on the resist layer of the disc, a portion of the beam is projected also onto the surrounding peripheral parts of the intended positions for forming the pits. That is, undesired beam portions are projected onto also parts where, originally, the beam is not intended to be projected.

Consequently, those parts of the information signal recording track in the spaces between the pits are subjected more intensely than the parts of the spaces between adjacent tracks to the effect of the undesired beam portions. After the developing process, the recorded track parts are somewhat lower and depressed than the parts (land parts) of the spaces between adjacent tracks.

The second cause of the above described phenomenon is that the reproducing stylus is subjected to different forces respectively at the track parts and at the parts of the spaces between adjacent tracks. The pit density in the information signal track parts is high, and only the parts thereof of the spaces between the pits contact the reproducing stylus. Consequently, the area of contact of these parts is small, whereby these parts are easily recessed by the contact of the reproducing stylus, whereas the parts of the spaces between adjacent tracks are not easily recessed.

As a consequence, in the case where the disc surface is traced by a reproducing stylus having a bottom surface with a part of a width greater than the track pitch, the wear of the part of the bottom surface of the reproducing stylus contacting the track becomes small, while the wear of the part contacting the parts of the spaces between adjacent tracks becomes great because of the above described first and second causes. For this reason, the reproducing stylus is guided respectively by the track part and the parts of the spaces between adjacent tracks, whereby the above described phenomenon arises.

Accordingly, in the present invention, by a novel arrangement of the information track, a reproducing stylus guide groove is not intentionally provided, and, moreover, the occurrence of the effect of a reproducing stylus guide, even in resultant effect, is prevented.

On the other hand, the input-output characteristic of a reproducing apparatus for reproducing a rotary information signal recording medium, in general, is nonlinear, and the reproduced information signal and the reference signals are caused by this nonlinear characteristic to undergo cross modulation, giving rise to nonlinear distortion. For this reason, in the case where the information signal is a video signal, the picture quality of the reproduced picture deteriorates, while, in the case of an audio signal, the tone quality of the reproduced sound deteriorates.

One possible measure for preventing distortion (interference distortion) due to the above mentioned cross modulation is to effect an improvement of the linearity of the reproducing system. However, it is very difficult to cause the characteristics of the reproducing system to be perfectly linear, and a system so adapted would entail an extremely high cost.

The magnitude of the interference distortion occurring in the reproduced signal in the reproducing system corresponds to the difference between the levels of the information signal and the reference signals. Accordingly, by causing the level of the reproduced reference signal to be lower than the level of the reproduced information signals and, moreover, by causing the above level difference to be greater than a specific level difference, the magnitude of the interference distortion which develops can be reduced to a degree which is not detrimental for practical purposes.

However, in the case of reproduction of signals recorded by forming pits in the disc, the magnitude of the level of a reproduced output signal increases with the wavelength of signal recorded on the disc, increases with the pit depth up to a certain depth, and, furthermore, increases with the pit width (in the case where a reproducing stylus having an electrode width corresponding to the pit width is used). Therefore, by suitably selecting values such as the width and depth of the pits, the level of a reproduced output signal can be set at a desired value.

SUMMARY OF THE INVENTION

It is a general object of the present invention, in one aspect thereof, to provide a novel and useful information signal recording medium of rotary type in which the above described problems encountered in the prior art have been overcome, and which, moreover, is a further development of the previously proposed system and makes possible its reduction to practice, and, in another aspect thereof, to provide a novel and useful apparatus for recording information signals on the medium.

Another and specific object of the invention is to provide an information signal recording medium of rotary type on which an information signal is recorded by forming in the recording medium surface a succession of pits in response to the information signal along a track comprising tracks of a certain track pitch, the width of each pit, that is, the track width, being substantially equal to or larger than the track pitch and to provide a recording apparatus for this recording medium. According to the invention, adjacent tracks thus formed are mutually contiguous or their edges are overlapping. By this track arrangement, that is, pit arrangement, the occurrence of the reproducing stylus guiding phenomenon as described hereinbefore during reproduction by a reproducing stylus is prevented. Furthermore, problems such as an undesirable lowering of the reproduced output and an unexpectedly high rate of wear and damage of the reproducing stylus and the rotary recording medium do not arise.

Still another object of the invention is to provide an information signal recording medium of rotary type as stated above on which, in addition, reference signals are recorded along substantially intermediate positions between the centerlines of the adjacent information signal tracks, the reference signals being so recorded as to be reproduced with a level which is lower than that of the information signal, and which differs from that of the information signal by at least a specific level difference and to provide a recording apparatus for this recording medium. By this feature, the reproduced reference signals do not impart an interference distortion effect on the reproduced information signal.

A further object of the invention is to provide an information signal recording medium of rotary type as stated above on which reference signals are recorded in only intervals corresponding to specific sections of the information signal track, and, moreover, the signals are so recorded that no nonuniformity arises in the recorded surface over the specific sections and over the other sections and to provide a recording apparatus for this recording medium.

A still further object of the invention is to provide an information type on which an information signal is recorded, and reference signals of wavelengths shorter than that of the information signal are recorded by a recording beam of low degree of modulation.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 10 is a schematic block diagram showing the essential organization of a second embodiment of the recording apparatus according to the invention; and FIGS. 11A and 11B are graphs respectively for explaining modulation degrees of light beams.

DETAILED DESCRIPTION

Figure 1:
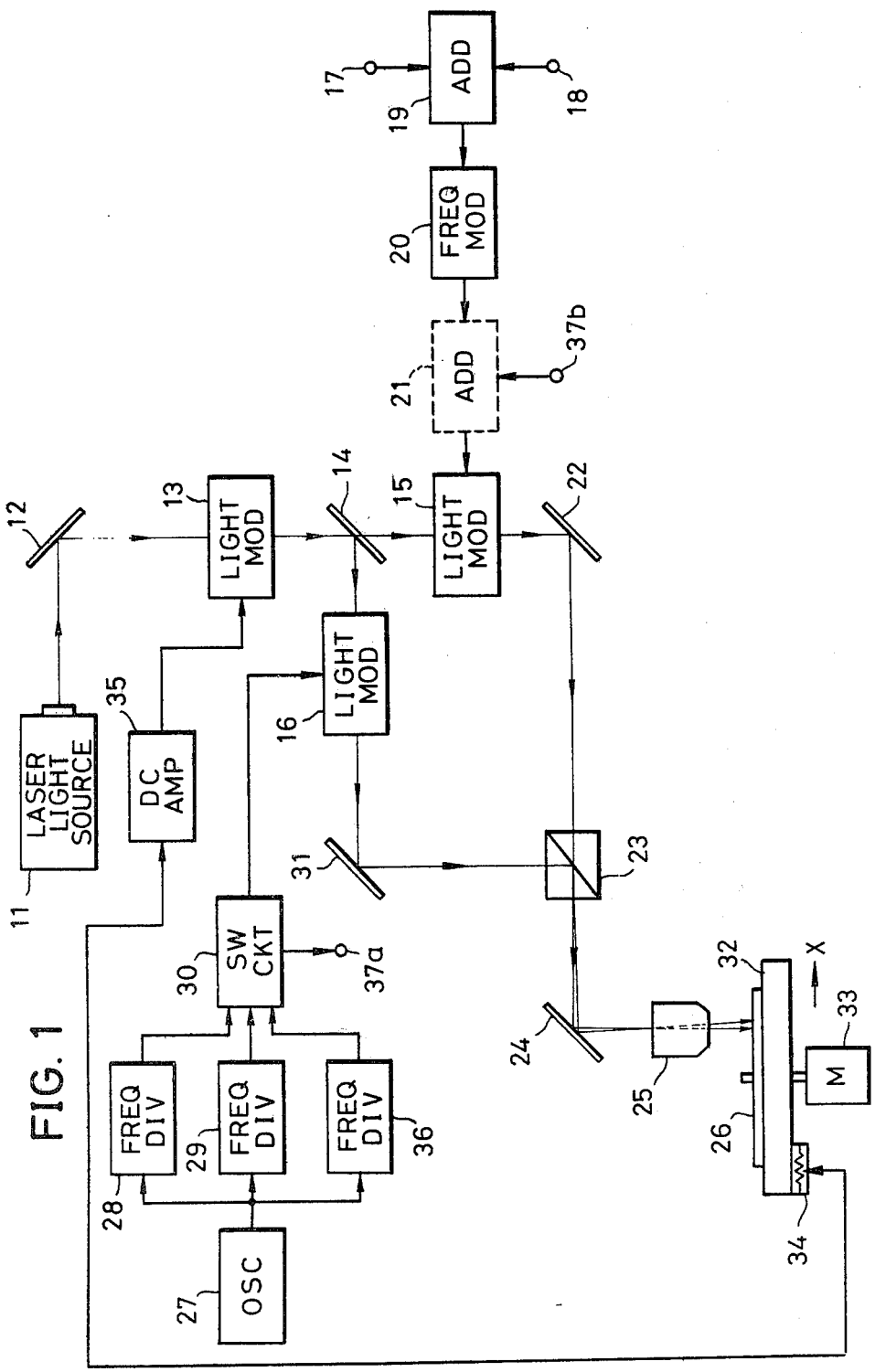
FIG. 1 is a schematic block diagram showing the essential organization of a first embodiment of the apparatus according to the present invention for obtaining an information signal recording medium of rotary type.

Referring first to FIG. 1 showing the first embodiment of the recording apparatus according to the present invention, a laser light beam emitted from a laser light source 11 is reflected by a mirror 12 and passed through a light modulator 13 for light quantity adjustment. The light beam thus adjusted is projected onto a half mirror 14, which transmits one part of the light to a light modulator 15 and reflects another part thereof to another light modulator 16.

Information signals such as, for example, a color video signal and a frequency modulated audio signal to be recorded are supplied respectively through input terminals 17 and 18 to an adder 19. The added output of this adder 19 is supplied to a frequency modulator 20 to frequency modulate a carrier wave. The resulting output, frequency-modulated signal is supplied as a main information signal to the above mentioned light modulator 15 to modulate the light beam transmitted through the half mirror 14. The frequency-modulated signal has a carrier wave center frequency of 7.0 MHz and has a frequency deviation width of 2.2 MHz. The resulting output is projected as a first modulated light beam onto a mirror 22, by which it is reflected, and is passed through a polarizing prism 23. The light thus transmitted through the prism 23 is reflected by a mirror 24, passes through an objective lens 25, and is brought to a focus on a photosensitive agent applied as a coating on a recording original disc 26 made of material such as glass.

On the other hand, a reference oscillator 27 produces an output signal of 3.58 MHz which synchronizes with a color subcarrier of the color video signal. This output signal is frequency divided by 1/5 and 1/7, for example, at frequency dividers 28 and 29, respectively, and thus rendered respectively into reference signals (hereinafter referred to as pilot signals) for tracking control of a frequency fp1 (of 716 KHz) and a frequency fp2 (of 511 KHz). The signal from the oscillator 27 is frequency divided by 1/13 into a pilot signal of frequency fp3.

The pilot signals of frequencies fp1, fp2 are alternately switched by a switching circuit 30 every period corresponding to each revolution of the disc 26. The pilot signal of frequency fp3 is also switched, at the switching circuit 30, into a signal existing in periods corresponding vertical blanking periods of the video signal. The output pilot signals from the switching circuits 30 are supplied to the light modulator 16. In a modification, the pilot signal of frequency fp3 from the switching circuit 30 is not supplied to the light modulator 16, but may be supplied to an adder 21, through terminals 37a and 37b, in which it is added to the frequency modulated main information signal from the frequency modulator 20. In this modification, the pilot signal of frequency fp3 is recorded at positions corresponding to the vertical blanking periods in the main information signal track.

The light beam reflected by the aforementioned half mirror 14 is modulated in the light modulator 16 by the above mentioned pilot signals, and the resulting output is reflected as a second modulated light beam by a mirror 31, thus being introduced into the polarizing prism 23, where its polarization plane is angularly shifted by 90 degrees from that of the above mentioned first modulated light beam. The second modulated light beam leaving the polarizing prism, together with the first modulated light beam, is reflected by the mirror 24, passes through the objective lens 25, and is focused on the recording original disc 26.

The original disc 26, which is mounted on a turntable 32, is rotated at a rotational speed of, for example 900 rpm., by a motor 33. The original disc 26, turntable 32, and motor 33 are unitarily and continuously transported at a specific pitch in the arrow direction X by a transporting mechanism (not shown). As a result, the aforementioned main information signal and the pilot signals are recorded along a spiral track on the original disc from its outer periphery toward its central part respectively by the first and second modulated light beams.

Furthermore, a displacement position detector 34 comprising a potentiometer is provided to detect the displacement position due to the above described transporting movement as the original disc 16 and the turntable 32 are transported in the above mentioned arrow direction X and to produce as output a DC voltage responsive to the displacement position. This detected DC voltage is passed through a DC amplifier 35 and applied to the aforementioned light modulator 13 for light quantity adjustment thereby to control the intensity of the light beam from the laser light source 11 in responsive accordance with the position in the radial direction of the original disc 26 of the light beam spot focused on the disc 26. By this arrangement and operation of the recording apparatus, compensation is provided so as to eliminate the effect of difference in relative linear speed due to the position of the light beam spot in the radial direction of the original disc 26.

The position, shape, dimensions, intensity, and other particulars of the spot of each of the first and second modulated light beams projected onto the original disc 26 are so selected that the pit arrangement described hereinafter will be obtained.

The original disc 26 exposed to light in the above described manner is subjected to a known developing process and to a known disc fabricating process, whereupon a completed recorded disc is obtained. The recorded disc comprises, for example, a disc substrate made of polyvinyl acetate (PVAC), in which the pits are formed in the spiral track, a metal coating formed with a thickness of 400 A, for example, on the disc substrate to constitute an electrode, and a dielectric coating film of a thickness of 400 A adhered onto the metal coating. The disc may be caused to possess an electrode function by using another material instead of providing a metal coating film.

It is to be observed that an electron beam may be used in place of a laser light beam in the above described apparatus. Furthermore, instead of the arrangement wherein the original disc, turntable 32, and motor 33 are transported in the arrow direction X, an arrangement wherein an optical system for projecting the light beams onto the original disc 26 is transported in the direction opposite to the arrow direction X may be used.

Figure 2:
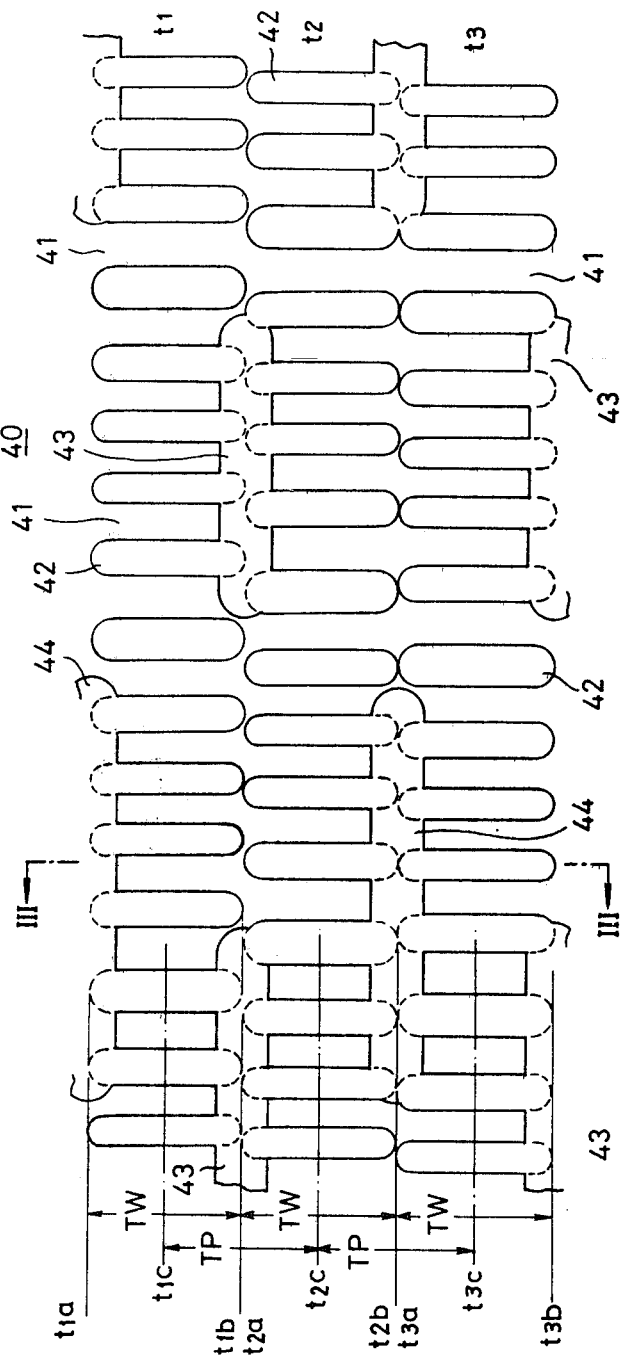
FIG. 2 is a greatly enlarged plan view of one part of a first embodiment of the information signal recording medium of rotary type according to the invention.

The first embodiment of the disc according to the invention obtained by recording by means of the recording apparatus illustrated in FIG. 1 and described above will now be described with reference to FIGS. 2 and 3. The surface 41 of those parts of the disc 40 in which pits are not formed are planar and are not provided with a guide groove. Pits 42 are formed in the disc 40 in responsive accordance with the above mentioned main information signal. In FIG. 2, only one part of the main information signal tracks turns t1, t2, and t3 comprising each of successions of pits 42 is shown. The tracks t1, t2, t3, . . . are those of a single spiral track and are respectively parts corresponding to revolutions of the disc 40. In the present embodiment of the invention, an information signal of four fields of a video signal are recorded along the track.

Figure 3:
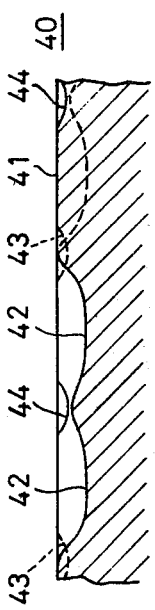
FIG. 3 is a vertical section taken along the line III—III in FIG. 2.

Each pit 42 is shown in FIG. 2 as being of an elongated shape with parallel sides and semicircular ends, but, actually, the pit 42 is not formed with uniform depth over its entirety but has a cross sectional shape as shown in FIG. 3. The line of demarcation of the figure of each pit 42 in FIG. 2 indicates the boundary edge where the pit starts to become recessed relative to the flat surface 41 in FIG. 3. The width TW of each track t1, t2, t3, . . . is equal to the "width" (dimension in the transverse direction of the track) of each pit 42, and the track edge lines t1a, t1b, t2a, t2b, t3a, t3b, . . . are indicated by imaginary lines passing through the end parts in the transverse direction of the pits 42 in each track. The above mentioned "width" of each pit 42 is herein defined as being the maximum dimension of the pit as viewed in plan view in the direction perpendicular direction of the track (that is, in the radial direction of the disc). It is to be noted that the cross sectional shape of each pit is not limited to that shown in FIG. 3. Each pit may be recessed in effect.

The configuration of pits do not show definite configuration as illustrated in FIGS. 2 and 3, but show complicated configuration in actual. However, in these figures, the configuration is illustrated in principle.

In the present embodiment of the invention, the pits 42 are so formed that one of the edge lines of each track is substantially coincident with the nearest edge line of the adjacent track. That is, the adjacent tracks t1, t2, t3, . . . are so formed that they are successively contiguous. Accordingly, the track pitch TP is substantially equal to the track width TW.

At central positions (coinciding with the edge lines of the tracks in the present embodiment of the invention) approximately intermediate between the centerlines t1c and t2c, t2c, and t3c, . . . of the mutually adjacent tracks t1 and t2, t2 and t3, . . . , pilot signal pits 43 and 44 responsively corresponding to the aforementioned pilot signals of the frequencies fp1 and fp2 are formed.

Figure 4:
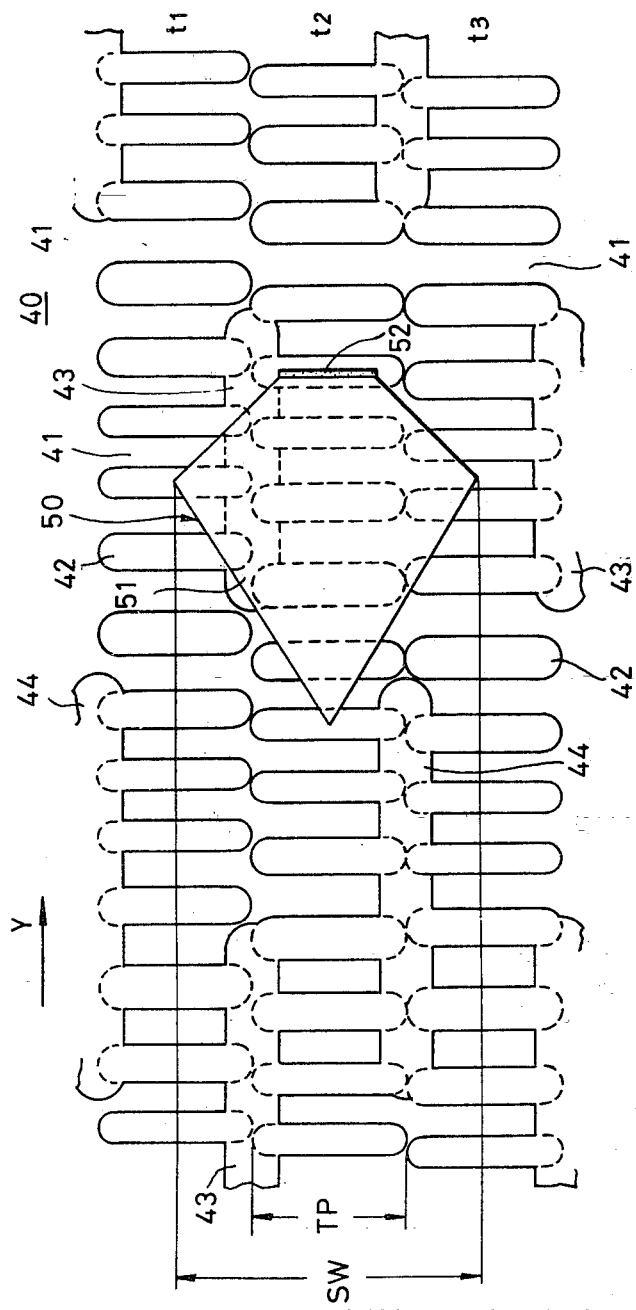
FIG. 4 is as greatly enlarged plan view showing the state of the information signal recording medium shown in FIG. 2 being traced by a recording stylus.

The state of a reproducing stylus 50 tracing the recorded track of the disc 40 having the above described pit arrangement is indicated in FIG. 4, in which only the bottom face 51 of the stylus 50 and the bottom face of an electrode 52 are shown. The bottom face 51 of the stylus has a part of maximum width SW, which is greater than the track pitch TP of the disc 40, and an electrode 52 having a thickness of 500–3000 A is fixed to the rear face of the stylus at the rear edge of the bottom face 51. As the disc 40 rotates in the arrow direction Y, the reproducing stylus 50 traces relatively along the surface of the disc 40, the electrostatic capacitance between the electrode 52 and an electroconductive layer covering the entire surface of the disc varies in response to the pits 42, whereby the main information signal recorded by the pits 42 is reproduced.

At the same time, the pilot signals of frequencies fp1 and fp2 recorded by the pits 43 and 44 are also reproduced by the electrode 52. In the case where the center of the electrode 52 deviates from the centerline of the track, a level difference occurs in the reproduced pilot signals, and tracking serve operation is carried out by a circuit described hereinafter.

Here, since the main information signal tracks comprise series or successions of pits formed in substantially contiguous state as described above in the present embodiment of the invention, the effect of unnecessary light beam parts at the time of projection of the light beams onto the original disc by the aforedescribed recording apparatus can be made substantially uniform over the entire recording surface. Furthermore, since there are no spacing parts between adjacent tracks, the bottom face 51 of the stylus structure during tracking and reproducing by the reproducing stylus 50 is in sliding contact with the disc surface in a substantially uniform state, and the aforedescribed groove guiding phenomenon does not arise.

Furthermore, since the adjacent tracks are contiguous to each other, the pit width (i.e., track width) can be set at a greater value if the track pitch is the same as in the conventional case, whereby the S/N ratio becomes greater. Alternatively, if the pit width is made the same as in the conventional case, the track pitch can be decreased, whereby the recording capacity is increased.

While the tracks are shown in FIG. 2 to be precisely formed in contiguous arrangement to illustrate a principle of the invention, it is difficult in actual practice to form the pits with the tracks in this precisely contiguous state. For example, in some instances, certain tracks are formed in a slightly spaced apart state partly in the disc radial direction because of irregularities in the pitch of the feed screw of the mechanism for moving the original disc 26 in the arrow direction X in the recording apparatus. However, even in this case, the aforedescribed groove guiding phenomenon does not occur in practice, whereby no problem arises. The important point is that, as long as the intention in the design concept is to form the tracks in substantially contiguous state, the result is within the purview of the purport of the present invention.

For the reproducing stylus 50, a stylus of a shape as proposed previously in the aforecited application, for example, is used. In the reproducing stylus 50 of this character, the electrode 52 is of a construction such that the electrode width at the bottom face thereof does not become very large even when the bottom face of the electrode becomes worn, whereby the life of the stylus is prolonged. If the width of the electrode is too small, the reproduction level of the main information signal will be excessively low. For this reason, the width is made greater than a specific value at the start of the use of the electrode. When the electrode becomes worn after a long period of use, and the electrode width increases to a value such that the electrode reproduces also the adjacent tracks, the stylus has reached its life end.

When the electrode 52 is tracing the track in a state wherein it is directly over or covering the pits 43 and 44, variations in capacitance occur, of course, but capacitance variations occur and the pilot signals are reproduced even when the electrode 52 is not directly over the pits 43 and 44.

Here, the recording disc is so adapted that interference distortion arising between the main information signal and the pilot signals because of the nonlinear characteristic of the reproducing system is reduced to a degree such that there is no adverse effect in practice.

For example, in the case where the main information signal is a color television video signal, in order to produce a normal reproduced color television picture which is unaffected by interference distortion for practical purposes, it is necessary that the reproduced color video signal have a level which is at least 28 dB higher than that of the interference distortion. Then, in order to obtain such a level difference relationship, it is necessary that the reproduced main information signal have a level which is at least 10 dB higher than the reproduced pilot signals.

Accordingly, the relationships between the width and depth of the main information signal pits 42 and the width and depth of the pilot signal pits are so selected that the level of the reproduced pilot signals will have the above mentioned level difference and be lower than the level of the reproduced main information signal, whereby interference distortion will not develop to a degree such that it will be a problem in practice. However, while the reproduced pilot signal level is said to be low, it is, of course, higher than the minimum level required for normal tracking control operation.

The widths and depths of these pits 42, 43, and 44 are determined with consideration of factors such as the frequencies of the main information signal and the pilot signals, the width of the electrode 52 of the reproducing stylus, and the positional relationships of the pits.

The above mentioned level difference can be obtained by selecting one or the other of the following relationships for the width W1 and depth D1 of the main information signal pits 42 and the width W2 and depth D2 of the pilot signal pits 43 and 44.

$$W1 > W2, D1 > D2$$

Here, specific values of the above mentioned pit widths W1 and W2 and pit depths D1 and D2 are so determined that the level L1 of the reproduced main information signal will be higher than the level L2 of the reproduced pilot signals and that, moreover, the level difference (L1−L2) of these signals will be at least 10 dB.

These values can be realized by suitably selecting the intensities of the light beams projected from the light modulators 15 and 16, through the above described light paths, and onto the original disc 26 and the airy disc diameter.

Figure 5:
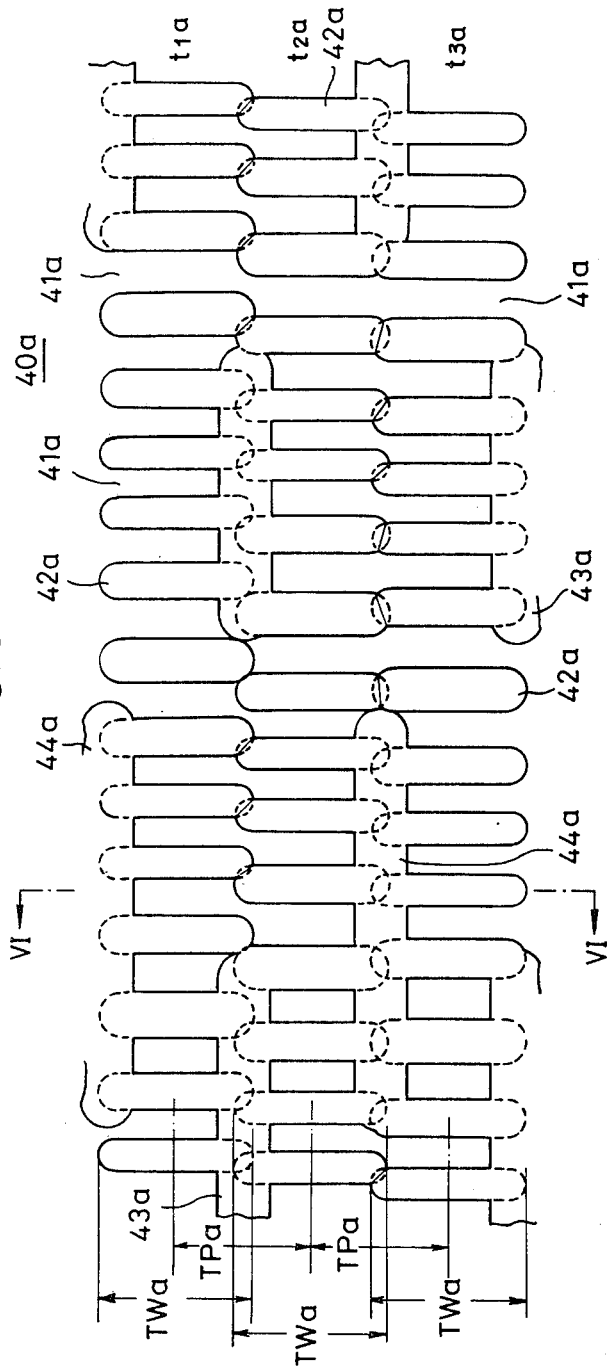
FIG. 5 is a greatly enlarged plan view of one part of a second embodiment of the information signal recording medium of rotary type according to the invention.
Figure 6:
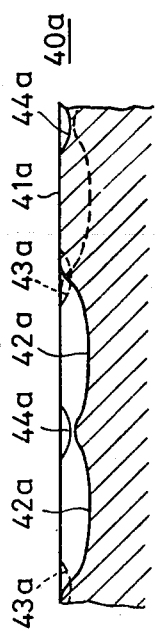
FIG. 6 is a vertical section taken along the line VI—VI in FIG. 5.

In the second embodiment of the invention as illustrated in FIGS. 5 and 6, the track width TWa is selected at a value larger than the track pitch TPa, and the edges of adjacent tracks are overlapped. In FIGS. 5 and 6, those parts and dimensions which correspond to parts and dimensions in FIGS. 2 and 3 are respectively designated by like reference numerals and characters with the addition of the subscript a. Description of such parts will be omitted.

In the case of the present embodiment of the invention, also, similarly as in the preceding first embodiment of the invention, the aforedescribed effects are obtained. Furthermore, for preventing interference distortion the above described relationships of the widths and depths of the pits are selected similarly as in the first embodiment of the invention.

Specific examples of numerical values of the configurations, shapes, and dimensions of the pits in the discs of the first and second embodiments of the invention are set forth below.

|  | Disc I | Disc II |
|---|---|---|
| Track pitch TP, TPa | 2.0~2.6 μm | 1.2~1.4 μm |
| Width W1 of main information signal pits 42, 42a (track width TW, TWa) | 2.0~2.8 μm | 1.2~1.6 μm |
| Width W2 of pilot signal pits 43, 43a, 44, 44a | 0.7~1.0 μm | 0.5~0.8 μm |
| Depth D1 of main information signal pits 42, 42a | 0.2~0.5 μm | 0.2~0.4 μm |
| Depth D2 of pilot signal pits 43, 43a, 44, 44a | 0.03~0.15 μm | 0.03~0.15 μm |
| Width of electrode 52 of reproducing Stylus | 0.5~2.2 μm | 0.4~1.1 μm |

Disc I: Diameter, 30 cm.; rotational speed, 900 rpm.; playing time, 30 min. per face.
Disc II: Diameter, 30 cm.; rotational speed, 900 rpm.; playing time 60 min. per face.

An example of an apparatus for reproducing (playing) the above described disc will now be described with reference to FIG. 7. The recorded disc 40 is rotated on and together with a turntable 62 at a rotational speed of 900 rpm. by a motor 61. The track on the disc 40 is traced by the reproducing stylus 50 which is fitted in a reproducing transducer 63. A reproduced signal picked up as a minute variation of electrostatic capacitance by the reproducing stylus 50 from the disc 40 is supplied to a preamplifier 64 having a resonant circuit. The resonant frequency varies in response to this variation in electrostatic capacitance and is formed into a signal of a desired level. The resulting output of the preamplifier 64 is demodulated into the original information signal by a demodulator 65 and is sent out as an output through an output terminal 66.

The output signal of the preamplifier 64 is supplied respectively to amplifiers 67, 68, and 77. Here, each of the amplifiers 67 and 68 is a kind of band-pass amplifier. The amplifier 67 is designed to have a steep passing frequency characteristic at only the frequency fp1. The amplifier 68 is designed to have a steep passing frequency characteristic at only the frequency fp2. The reference signals obtained separately from the amplifiers 67 and 68, respectively, pass through level adjustors 69 and 70, where their levels are adjusted. The resulting signals are then supplied to a gate switching circuit 71.

The amplifier 77 is a kind of band-pass amplifier which is designed to have a steep passing frequency characteristic at only the frequency fp3. The reference signal of the frequency fp3 obtained from the amplifier 77 is detected at a detector 78 and is thereafter derived from a terminal 79. The derived signal is wave formed into a pulse responsive to the reproducing modes, and is utilized for obtaining pulses adapted to be supplied to terminals 72 and 76.

The gate switching circuit 71 is supplied through an input terminal 72 with a switching pulse which undergoes polarity inversion every revolution of the disc and thereby supplies the pilot signals of frequencies fp1 and fp2 respectively to detector circuits 73 and 74.

Figure 8:
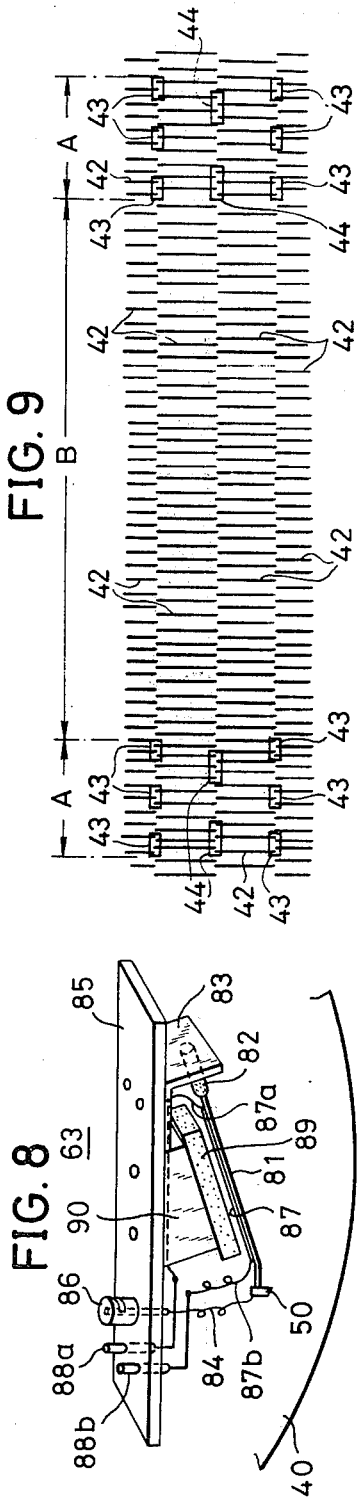
FIG. 8 is a perspective view of one example of a reproducing transducer in the reproducing apparatus illustrated in FIG. 7.

The detecting circuits 73 and 74 detect the envelopes of their respective input reference signals and convert the envelopes into DC voltages. These voltages are then supplied to the input terminals of differential amplifiers (not shown) within a tracking servo control circuit 75. This tracking servo control circuit 75 compares the output signals of the two detecting circuits 73 and 74 which vary in response to the reproduced levels of the reference signals. This generates an output tracking error signal which indicates the tracking error direction and the error quantity. The reproducing transducer 63 has an arrangement as shown in FIG. 8, for example. A cantilever 81 having at its free end a reproducing stylus 50 is mounted at its proximal end via a damper 82 on a bracket 83. The electrode of the reproducing stylus 50 is connected through a very thin lead wire 84 which is flexible and slackened to a terminal 86 provided on the support plate 85. A very thin gold wire 81 is bonded, except at its ends, to the cantilever 81 over a specific distance in the longitudinal direction thereof. Lead wire parts 87a and 87b of the end parts of this gold wire 87 are respectively connected in a slackened state to terminals 88a and 88b provided on the support plate 85. A permanent magnet 89 is secured by way of a bracket 90 to the lower surface of the support plate 85. The wire 87 is thus disposed in this strong magnetic field formed by the magnet 89.

The control signal from the tracking servo control circuit 75 is supplied between the terminals 88a and 88b. When the control signal current flows through the terminals 88a and 88b and through the wire 87, a displacement force acts on the wire 87 in the transverse direction perpendicular to the longitudinal direction of the cantilever 81 in response to the above mentioned current, according to the Fleming's left-hand rule, since the wire 87 is disposed within the magnetic field due to the magnet 89. Since the wire 87 is bonded to the cantilever 81, the cantilever 81 is displaced by the force acting on the wire 87. As a result, the reproducing stylus 50 is displaced in a direction perpendicular to the longitudinal direction of the track, and tracking control is so accomplished that the reproducing stylus 50 traces accurately along the track.

Figure 7:
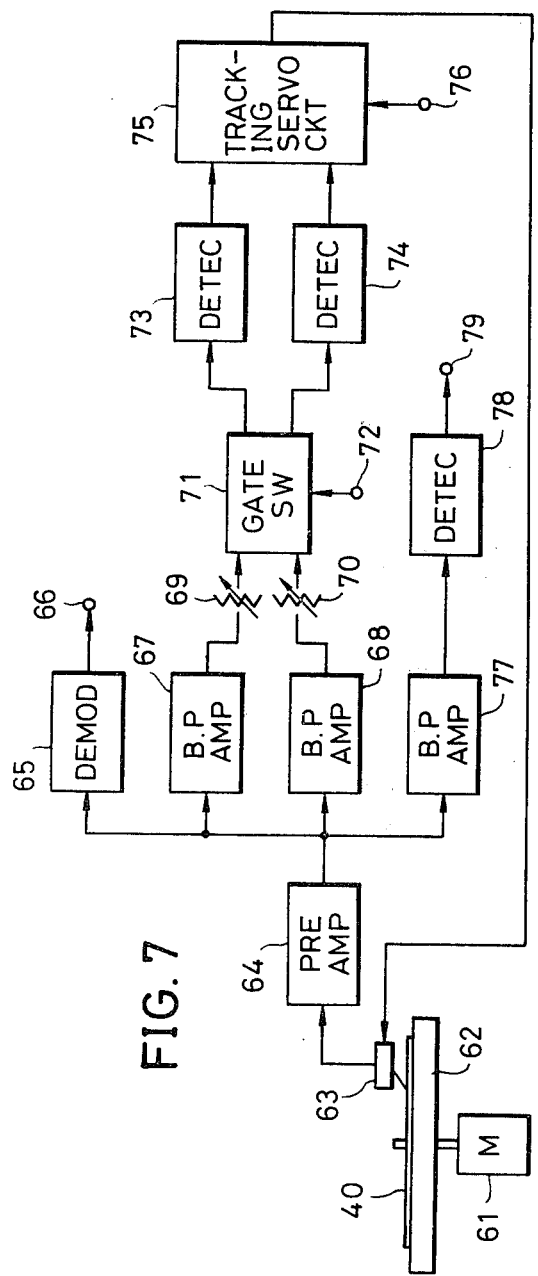
FIG. 7 is a schematic block diagram showing the essential organization of one example of an apparatus for reproducing a rotary information signal recording medium according to the invention.

When the reproducing apparatus is to be operated in a special reproducing mode such as still-picture reproducing, slow-motion reproducing, or quick-motion reproducing, a control pulse is applied through a terminal 76 as shown in FIG. 7 to the tracking servo circuit. This control pulse coincides with instant of phase switching of the switching pulse applied to the terminal 72. The tracking servo circuit 75 produces as output a signal for shifting the reproducing stylus 50 in the disc diametric direction by a specific distance.

Figure 9:
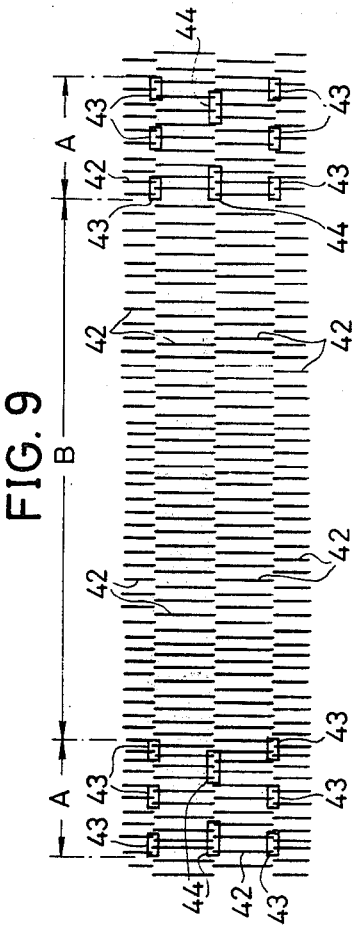
FIG. 9 is a greatly enlarged plan view of one part of a third embodiment of the rotary information signal recording medium according to the invention.

The pilot signals may be recorded along the entire length of the main information signal track, but in the case where the main information signal is a composite video signal, the pilot signals may be caused to be recorded at only positions corresponding to the horizontal blanking periods of the main information signal as indicated in FIG. 9. In FIG. 9, the pilot signal pits 43 and 44 are formed for recording in only the intervals A corresponding to the horizontal blanking periods of the composite video signal constituting the main information signal which is recorded in the form of the pits 42 and are not formed for recording in other intervals B corresponding to the video information signal periods. In the case where the pilot signal pits are formed in this manner, interference of the pilot signals with the video information signal can be further suppressed. It is to be noted that the magnification in FIG. 9 is less than that in FIGS. 2, 4, and 5.

In the case of this method of recording, however, the main information signal track cannot be formed uniformly throughout both intervals A and B because of unnecessary light due to reflection, scattering, etc., which occur during the formation of the pilot signal pits 43 and 44. More specifically, the track is formed in a somewhat more recessed manner in the intervals A than in the intervals B.

This problem has been overcome in another embodiment of the recording apparatus according to the invention as illustrated in FIG. 10. In FIG. 10, those parts with are the same as corresponding parts in FIG. 1 are designated by like reference numerals. Detailed description of such parts will not be repeated.

Pilot signals from the switching circuit 30 are supplied to the light modulator 16 and, at the same time to a signal generator 100 for generating a light quantity control signal. In the present embodiment of the invention, the pilot signals are led out only during periods corresponding to the horizontal blanking periods of the composite video signal. The light quantity control signal generator 100 operates to generate a control signal for decreasing the intensity of the laser beam from the laser light source 11 only in the periods wherein the pilot signals exist relative to the laser beam intensity in the other periods and to supply this control signal to the light modulator 13 for light quantity adjustment. As a result, the beam intensity of the light beam which has passed through the light modulator 13 in the periods corresponding to the periods wherein the pilot signals exist has been decreased relative to the beam intensity thereof in the other periods.

For this reason, in the intervals B in FIG. 9, only the pits 42 are formed, whereas, in the intervals A, the pits 42, 43, and 44 are formed. The effect of unnecessary light is great in the intervals A, but since the intensity of the light beam is reduced in these intervals A, recording is carried under a uniform state as a whole irrespective of whether the portion of the track is an interval A or whether it is an interval B, and the problem described above is overcome.

Still another embodiment of the recording system according to the invention will now be described. In this system, the main information signal has a very high frequency in a frequency band of, for example, 6 MHz to 8.2 MHz, and the recording wavelength is very short. Consequently, as is apparent from FIG. 2, the density of the pits 42 of the main information signal is high, and the spacing between the pits in the same track turn is small. In contrast, the pilot signals have low frequencies such as, for example, 716 KHz (511 KHz), and their recording wavelengths are long. Consequently, the pit densities of the pilot signal pits 43 (44) are low, and the spacings between their pits are large.

Therefore, at the time of recording, the space parts between the pits of the main information signal are subjected greatly to the effect of the unnecessary light, whereas the space parts between the pilot signal pits are subjected to relatively little effect due to the unnecessary light. For this reason, the degree of flatness of the recording surface of disc is impaired also by these circumstances.

Accordingly, in the present embodiment of the invention, the degrees of modulation of the light modulators 15 and 16 are selected as follows. The degree of modulation of the light modulator 15 for carrying out modulation with the main information signal is selected as indicated in FIG. 11A. In this figure, the level 0 (zero) indicates "light OFF", while the level 100 indicates "light ON". In contrast, the degree of modulation of the light modulator 16 for carrying out modulation with the pilot signals is selected at a low value as indicated in FIG. 11B. For example, at the time of "light OFF", light of the order of 10 percent is caused to exist. That is, a bias of the order of 10 percent is applied.

By selecting the degrees of light modulation in this manner, light of the order of 10 percent is applied at the time of recording in the spaces between the pits 43 (44) of the pilot signals. For this reason, a nonuniform state of the recording surface due to the difference in recording wavelengths of the pilot signals and the main information signal as described above does not occur.

In the above described embodiments of the invention, a television video signal and an audio signal were used for the main information signal as a first signal, and pilot signals for tracking control were used for the pilot signal as a second signal, but the use of signals is not so limited, it being possible to use respectively other desired signals such as, for example, stereophonic sound signals and pilot signals for jitter correction.

Furthermore, the tracks t1, t2, t3, . . . may be in the form of track parts corresponding to one revolution of the disc of a spiral track as in each of the above described embodiments of the invention, or they may be in the form of concentric tracks as long as they are tracks of substantially circular form.

While the rotary information signal recording medium according to the present invention is reproduced by an electrostatics capacitance variation method, since pilot signals for track control are recorded, it is possible to utilize these signals and carry out reproduction as tracking is normally effected by an optical method.

Further, this invention is not limited to these embodiments but various variations and modifications may be made without departing from the scope and spirit of the invention.

What is claimed is:
1. An information signal recording medium of rotary type free of a guide groove on a flat surface with first successions of pits formed therein as respective concavities in response to a television composite video signal and with second successions of pits formed therein as respective concavities in response to a reference signal for tracking, said first successions of pits forming tracks of a specific pitch, each pit being formed with a width, equal to the width of a track, which is substantially greater than said pitch of the tracks, said second successions of pits being formed at positions substantially intermediate between the centerlines of adjacent tracks formed by the first successions of pits with partial overlap on the first successions of pits said medium being arranged for tracing by a reproducing stylus having a sliding contact whose width is greater than the width of the track of the first successions of pits.

* * * * *